United States Patent [19]
Hara et al.

[11] Patent Number: 5,713,814
[45] Date of Patent: Feb. 3, 1998

[54] CONTROL SYSTEM FOR VEHICULAR DRIVE UNIT

[75] Inventors: Takeshi Hara, Chiryu; Shigeo Tsuzuki, Takahama; Satoru Tanaka, Nishio; Manabu Watanabe, Toyota; Kenji Omote, Nishio, all of Japan

[73] Assignee: Aisin AW Co., Ltd., Aichi-ken, Japan

[21] Appl. No.: 690,806

[22] Filed: Aug. 1, 1996

[30] Foreign Application Priority Data

Aug. 2, 1995 [JP] Japan .................................. 7-197460

[51] Int. Cl.$^6$ ............................ F16H 3/72; B60K 6/00; B60K 8/00; B60K 17/04
[52] U.S. Cl. ................................................ 477/5; 180/65.2
[58] Field of Search ........................ 477/3, 5; 180/65.2, 180/65.3, 65.6; 60/718

[56] References Cited

U.S. PATENT DOCUMENTS

| | | | |
|---|---|---|---|
| 4,335,429 | 6/1982 | Kawakatsu | 180/65.2 |
| 5,258,651 | 11/1993 | Sherman . | |
| 5,285,111 | 2/1994 | Sherman . | |
| 5,343,970 | 9/1994 | Severinsky | 180/65.2 |
| 5,415,603 | 5/1995 | Tuzuki et al. | 477/5 |
| 5,558,588 | 9/1996 | Schimdt | 180/65.2 |
| 5,637,987 | 6/1997 | Fattic et al. | 180/65.3 |

*Primary Examiner*—Dirk Wright
*Attorney, Agent, or Firm*—Oliff & Berridge, P.L.C.

[57] ABSTRACT

A control system for a vehicular drive unit having an engine, a motor-generator for acting as a motor and a generator; a power transmission including a planetary gear composed of at least three rotary elements and a mechanism for selectively connecting/releasing the rotary elements; a battery for storing electric power generated by the motor-generator and for supplying a driving electric power; a residue detector for detecting the state of charge of the battery; and a controller for controlling the engine, the motor-generator and the connecting/releasing mechanism in accordance with an output signal from the residue detector. The first rotary element of the planetary gear is connected to the output shaft of the engine; the second rotary element, as acting a reaction against the first rotary element, is connected to the motor-generator; and the third rotary element is connected to an output member for transmitting the drive power to wheels. The controller includes mode switching capability for switching the mode when the battery is in an ordinary state or in a low charge state, to a power split mode, in which the motor-generator outputs a reaction torque against the output torque of the engine so that the connecting/releasing mechanism can rotate the first, second and third rotary elements individually and, when the battery is in a full charge state, to a parallel hybrid mode, in which the motor-generator adds a torque to the output torque of the engine so that the connecting/releasing mechanism can rotate the first and second rotary elements together.

7 Claims, 16 Drawing Sheets

CONTROL SYSTEM FOR VEHICULAR DRIVE UNIT

BACKGROUND OF THE INVENTION

1. Field of the Invention

The invention relates to a control system for a vehicular drive unit and, more particularly, to a control system for a vehicular drive unit including an engine and a motor-generator.

2. Description of Related Art

In the prior art, there has been proposed a vehicular drive unit which includes a power transmission between an engine and a speed change mechanism and a motor-generator connected to the power transmission as disclosed in U.S. Pat. No. 5,285,111.

According to this vehicular drive unit, the motor-generator outputs a reaction against the output torque of the engine so that the vehicle may be started by the combined torque of the engine and that of the motor-generator. At the start of the vehicle, therefore, the motor-generator always functions as a power generator to store the kinetic energy of the rotary elements of a planetary gear as electrical power in a battery and to use the stored electrical power for driving the accessories and assisting the engine thereby to improve the mileage of the vehicle.

According to the characteristics of the battery, however, the battery is damaged if it is further charged when its state of capacity exceeds a predetermined value or is in a full charge state. In the aforementioned related art, the battery is charged at the start by the power generated by the motor-generator no matter how fully charged the battery might be. This structure deteriorates the performance of the battery and shortens the battery's life.

SUMMARY OF THE INVENTION

In order to solve the above-specified problem, the invention has an object to provide a control system for a vehicular drive unit including an engine and a motor-generator, which can start the vehicle properly according to the charged state of the battery.

In order to achieve this object, according to a first aspect of the invention, there is provided a control system for a vehicular drive unit comprising an engine; a motor-generator for acting as a motor and a generator; a power transmission including a planetary gear having at least three rotary elements and apply means, such as an input clutch and a direct-coupled clutch, for connecting/releasing the rotary elements selectively; a battery for storing electrical power as generated by the motor-generator, and for supplying a driving electrical power; residue detecting means for detecting the residue of the battery; and control means for controlling the engine, the motor-generator and the apply means in accordance with an output signal from the residue detecting means. A first rotary element, or ring gear, of the planetary gear is connected to the output shaft of the engine; the second rotary element, or sun gear, reacts against the first rotary element and is connected to the motor-generator; and the third rotary element, or carrier, is connected to an output member for transmitting the drive power to wheels.

The control means includes mode switching means for switching the mode, if it is determined using the output signal of the battery residue detecting means that the battery is in an ordinary state or in a low charge state, to a power split mode in which the motor-generator outputs a reaction torque against the output torque of the engine so that the apply means may rotate the first, second and third rotary elements individually. If it is determined using the output signal of the battery residue detecting means that the battery is in a full charge state, the mode is switched to a parallel hybrid mode in which the motor-generator adds a torque to the output torque of the engine so that the apply means may rotate the first and second rotary elements together.

In the control system for the vehicular drive unit, there is further provided a throttle sensor for detecting a throttle opening, wherein when it is determined, using the output signal of the throttle sensor, that the throttle opening is below a predetermined value, the mode switching means switches the mode to a motor mode in which the motor-generator drives the vehicle so that the apply means may disconnect the output shaft of the engine and the first rotary element and may rotate the first and second rotary elements together.

In the control system for a vehicular drive unit, as set forth in the aforementioned structure, there is further included a battery temperature sensor for detecting the temperature of the battery, wherein when it is determined based upon the output signal of the battery temperature sensor that the temperature of the battery is not within an ordinarily controlled range, the mode switching means switches the mode to the parallel hybrid mode.

In the control system for a vehicular drive unit, as set forth in the aforementioned structure, there are further included an engine RPM sensor for detecting the RPM of the engine; and a motor-generator RPM sensor for detecting the RPM of the motor-generator, wherein when it is determined in the power split mode, based upon the output signals from the engine RPM sensor and the motor-generator RPM sensor, that the difference between the RPM of the engine and the RPM of the motor-generator is below a predetermined value, the mode switching means switches the mode to the parallel hybrid mode or an engine mode, in which the engine drives the vehicle, so that the apply means may rotate the first and second rotary elements together.

In the control system for a vehicular drive unit, as set forth in the aforementioned structure, when it is determined in the power split mode, based upon the output signal from the battery residue detecting means, that the battery is in the low charge state and, based upon the output signal from the motor-generator RPM sensor, that the RPM of the motor-generator is substantially zero, the mode switching means switches the mode to the parallel hybrid mode or the engine mode, in which the engine drives the vehicle, so that the apply means may rotate the first and second rotary elements together.

In the control system for a vehicular drive unit, as set forth in the aforementioned structure, there is further included a motor-generator RPM sensor for detecting the RPM of the motor-generator, wherein when it is determined in the motor mode, based upon the output signal from the motor-generator RPM sensor, that the RPM of the motor-generator is above a predetermined RPM, the mode switching means switches the mode to the parallel hybrid mode or the engine mode, in which the engine drives the vehicle, so that the apply means may connect the output shaft of the engine and the first rotary element.

In the control system for a vehicular drive unit, as set forth in the aforementioned structure, the mode switching means has a mode switching map for switching between the power split mode, the parallel hybrid mode and the motor mode in accordance with the vehicle speed and the throttle opening, and a plurality of mode switching maps are provided to correspond to the residue of the battery.

BRIEF DESCRIPTION OF THE DRAWINGS

The invention will be described with reference to the drawings, in which.

DESCRIPTION OF THE PREFERRED EMBODIMENT

The invention will be described in the following in connection with its embodiment and with reference to the accompanying drawings.

Figure 1:
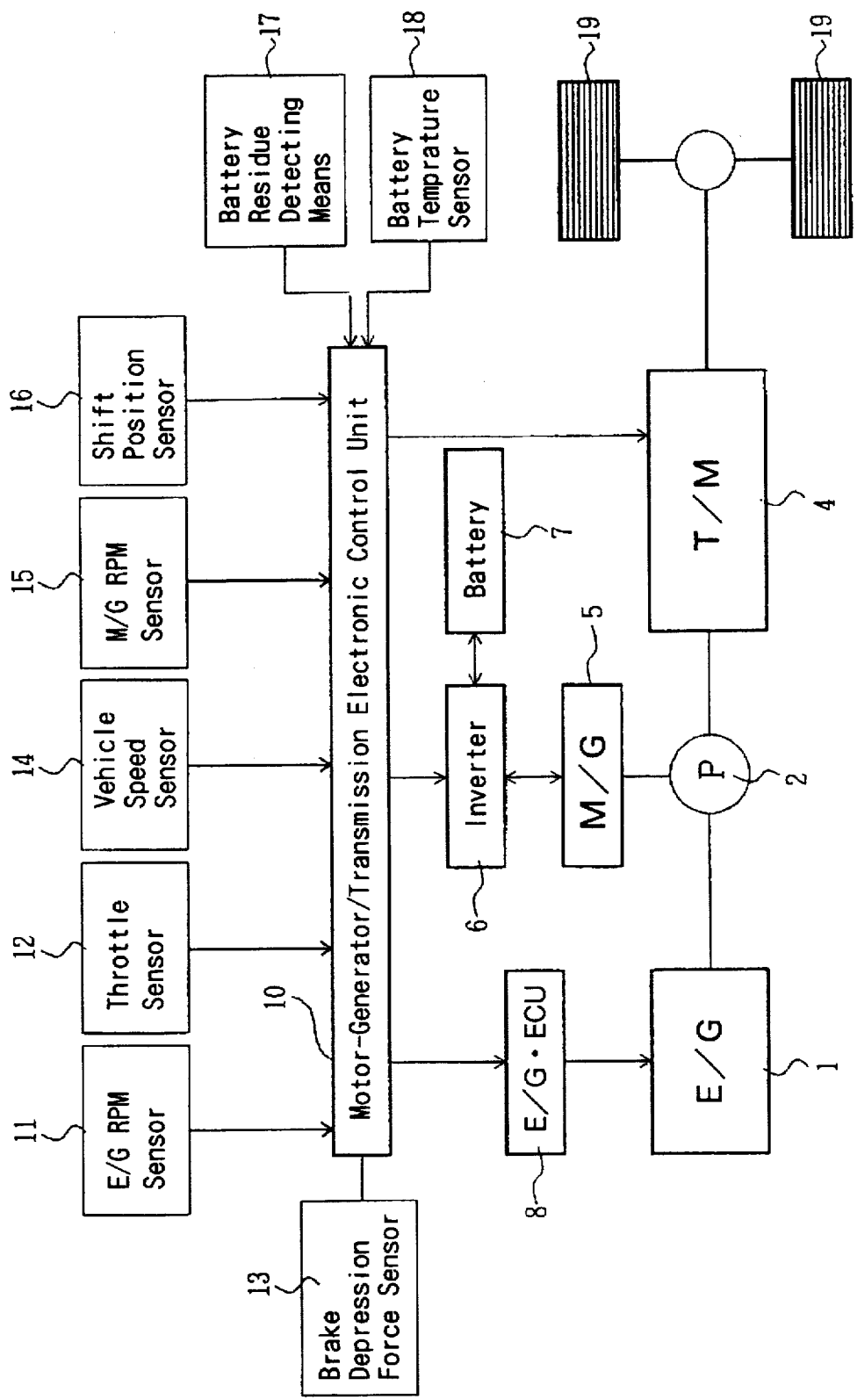
FIG. 1 is a block diagram showing the overall structure of a vehicular drive unit according to an embodiment of the invention.
Figure 2:
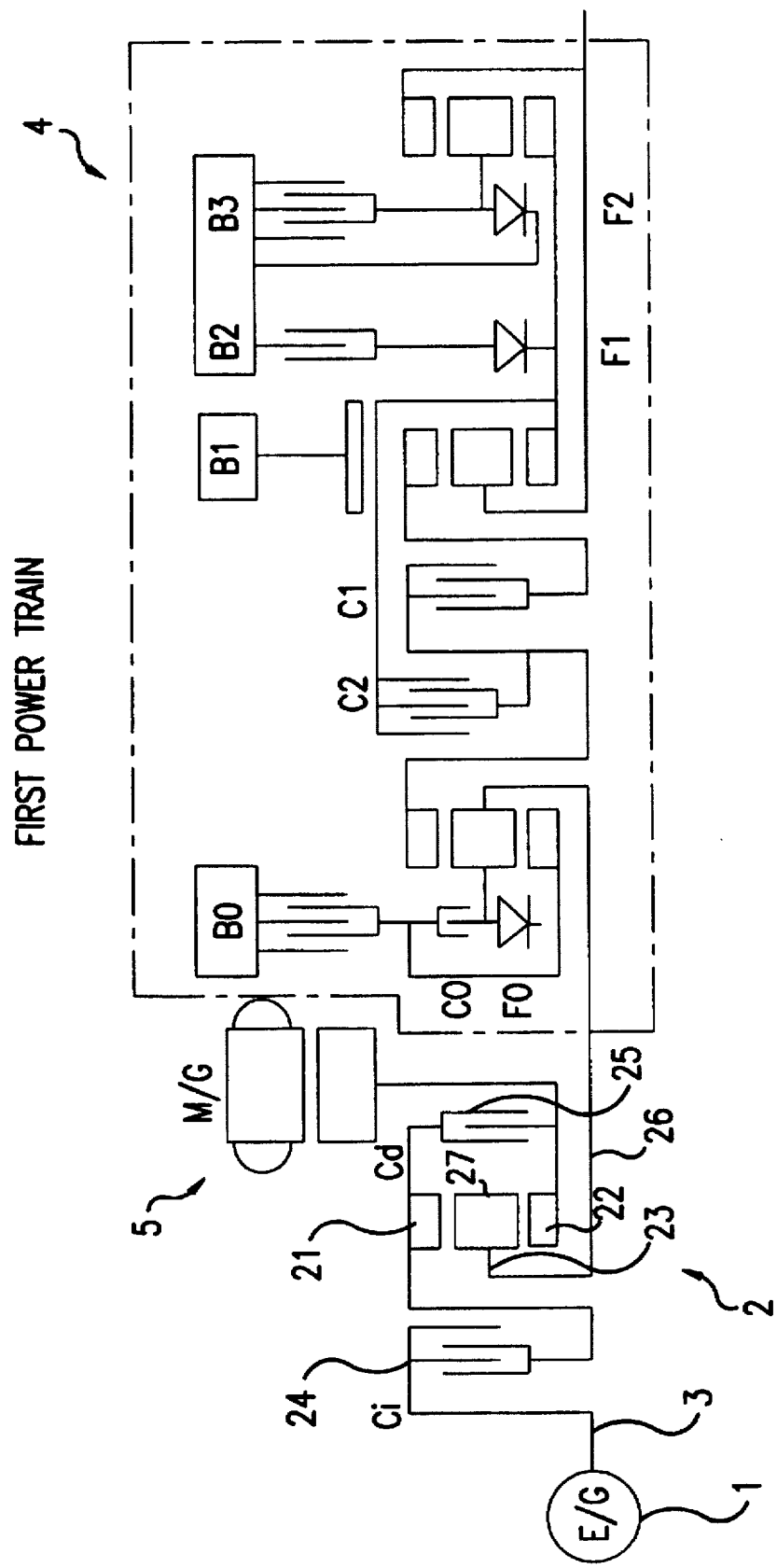
FIG. 2 is a schematic diagram showing a first power train structure of the vehicular drive unit according to the embodiment of the invention.
Figure 3:
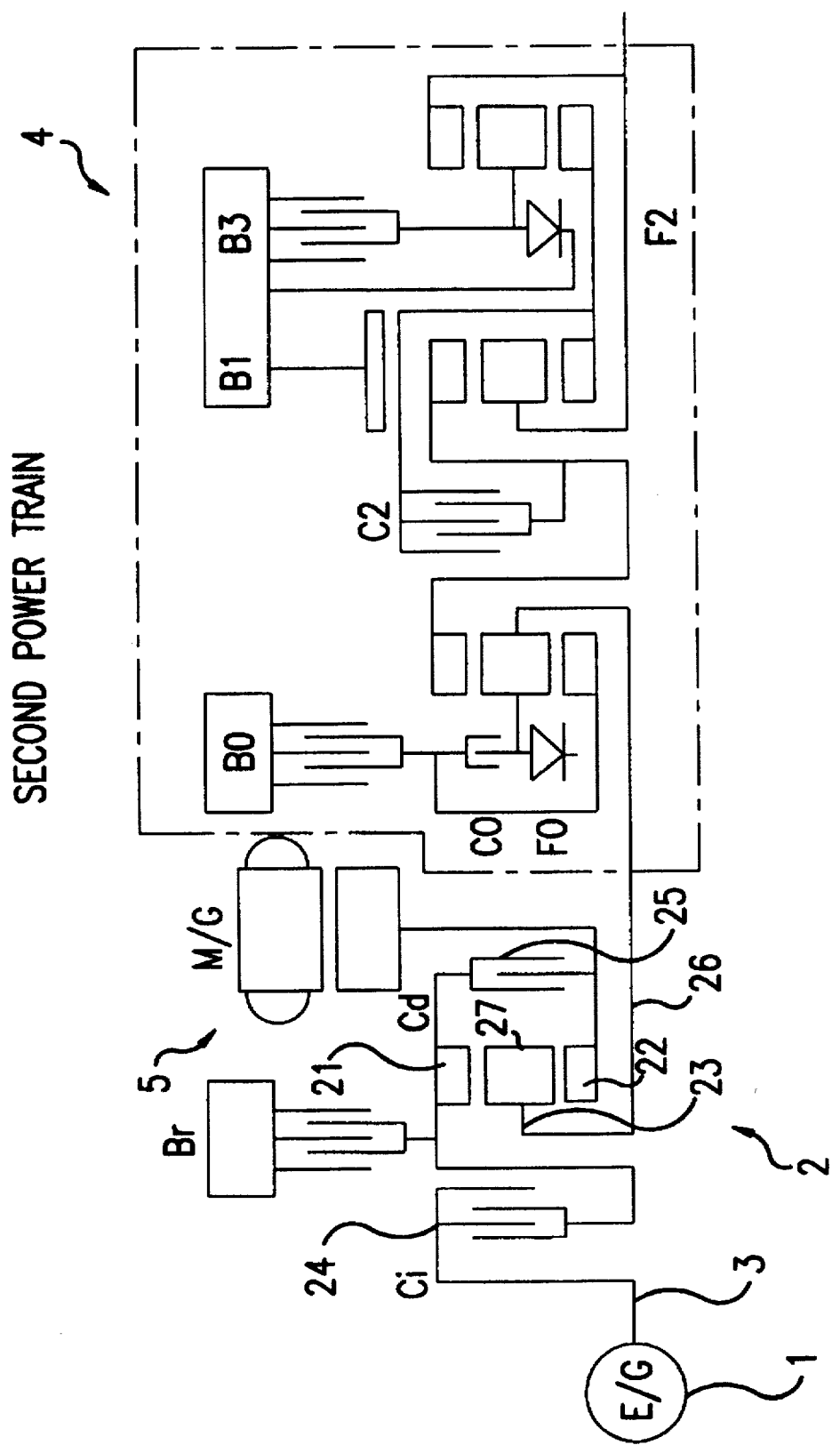
FIG. 3 is a schematic diagram showing a second power train structure of the vehicular drive unit according to the embodiment of the invention.

FIG. 1 is a block diagram showing the structure of a vehicular drive unit according to an embodiment of the invention; FIG. 2 is a schematic diagram showing a first power train structure of the vehicular drive unit; and FIG. 3 is a diagram showing a schematic second power train of the vehicular drive unit.

In these figures, reference numeral 1 designates an engine E/G, and numeral 2 designates a power transmission P. The power transmission or power distribution mechanism 2 includes a planetary gear composed of at least three rotary elements; and apply means for connecting/disconnecting the rotary elements selectively, such as an input clutch Ci and a direct-coupled clutch Cd, although its detail will be described hereinafter. Numeral 4 designates an automatic transmission T/M connected to the power transmission 2, and numeral 5 designates a motor-generator acting as a motor and a generator and connected to the power transmission 2. Numeral 6 designates an inverter connected with the motor-generator 5; numeral 7 is a battery connected with the inverter 6; numeral 8 is an engine electronic control unit E/G ECU; numeral 10 is a motor-generator/transmission electronic control unit; numeral 11 is an engine RPM sensor; numeral 12 is a throttle sensor; numeral 13 is a brake depression sensor; numeral 14 is a vehicle speed sensor; numeral 15 is a motor generator RPM sensor; numeral 16 is a shift position sensor; numeral 17 is a battery residue detecting means; numeral 18 is a battery temperature sensor; and numerals 19 are wheels.

Incidentally, the automatic transmission T/M is a four-speed automatic transmission which contains a clutch C0, a clutch C1, an one-way clutch F0; an one-way clutch F1, an one-way clutch F2, a brake B0, a brake B1, a brake B2, a brake B3, and planetary gears PG1 to PG3, or a brake Br.

Thus, the vehicular drive unit according to the invention includes the engine 1; the power transmission 2 connected to the output shaft of the engine 1 for acting as the power distribution mechanism to distribute the drive power; the motor-generator 5 connected to the power transmission 2; the battery 7 for storing the electric power, as generated by the motor-generator 5, through the inverter 6 and for feeding the electric power for driving the vehicle; the battery residue detecting means 17 for detecting the residue of the battery; and control means for controlling the engine 1, the motor-generator 5 and the power transmission 2 in response to the output signal of the battery residue detecting means 17. The planetary gear connects a first rotary element, or ring gear, 21 to the output shaft 3 of the engine 1, a second rotary element, or sun gear 22, acting as an reaction against to the first rotary element to the motor-generator 5, and a third rotary element, or carrier 23, supporting a plurality of pinion gears 27 to the output member 26 for transmitting the drive power to the wheels 19. Incidentally, the numeral 24 designates the input clutch Ci, and the numeral 25 designates the direct-coupled clutch Cd.

Here, the first power train of the vehicular drive unit, as shown in FIG. 2, is equipped with the power transmission composed of the planetary gear and the clutches Ci, Cd, and the four-speed automatic transmission known in the prior art, the speed changing operations of which will not be described because they are similar to those of the prior art.

The second power train is constructed by eliminating the reverse frictional engage element of the four-speed automatic transmission of the prior art and by mounting a reverse frictional engage element, or reverse brake Br, in the power transmission. As a result, the reverse stage is achieved by releasing the input clutch Ci but applying the reverse brake Br to drive the motor-generator 5 backward while leaving the automatic transmission at the forward stage. Incidentally, the speed changing operations for forward travel are similar to those of the prior art, and their repeated description will be omitted.

The charged state of the battery 7 will now be defined.

In the Ordinary State e.g., SOC=60 to 85%, the battery can be not only be charged but can also be discharged; in the Low Charge State, e.g., SOC<60%, the battery 7 performance will be deteriorated if discharged further; and in the Full Charge State, e.g., SOC>85%, the battery 7 performance will be deteriorated if charged further.

According to the invention, therefore, during travel of the vehicle, when it is determined on the basis of the output signal from the battery residue detecting means 17 that the battery 7 is in the ordinary state or the low charge state, the input clutch Ci is turned ON and the direct-coupled clutch Cd is turned OFF so that the apply means, clutches Ci, Cd, can rotate the first, second and third rotary elements 21, 22 and 23 individually, thereby to establish the power split mode in which the motor-generator 5 outputs the reaction torque against the output torque of the engine 1. When it is determined on the basis of the output signal from the battery residue detecting means 17 that the battery 7 is in the full charge state, the input clutch Ci is turned ON and the direct-coupled clutch Cd is turned ON so that the apply means, clutches Ci, Cd, can rotate the first and second rotary elements 21, 22 together, thereby switching the mode to the parallel hybrid mode PH in which the motor-generator 5 adds torque to the output torque of the engine 1.

With this structure, the mode is switched between the power split mode and the parallel hybrid mode in accordance with the residue of the battery, as determined based upon the output of the battery residue detecting means 17. Specifically, when the battery 7 is in the ordinary state or in the low charge state, the mode is set to the power split mode, in which the first, second and third rotary elements 21, 22 and 23 of the planetary gear individually revolve, so that the motor-generator 5 outputs the reaction torque against the output torque of the engine 1 and the vehicle is driven by torque of the engine 1 reduced by the torque of the motor-generator 5 because, in this case, the motor-generator 5 is storing the energy of the second rotary element 22 as electrical power in the battery 7.

In the full charge state of the battery 7, on the other hand, the direct-coupled clutch Cd is applied to rotate the first and second rotary elements together thereby establishing the parallel hybrid mode so that the vehicle is driven by the output torque of the engine 1 and the motor-generator 5. Because the motor-generator functions as a motor in this case, the battery 7 is not charged and the battery's performance is prevented from being deteriorated by an overcharge.

In addition to the aforementioned structure, the throttle sensor 12 is provided for detecting the throttle opening. When it is determined based upon the output signal from the throttle sensor 12 that the throttle opening is less than a predetermined value, the apply means, clutches Ci, Cd, disconnect the output shaft 3 of the engine and the first rotary element 21, by turning OFF clutch Ci, and rotate the first and second rotary elements 22, 23 by turning ON clutch Cd, to switch the mode to the motor mode in which the motor-generator 5 alone drives the vehicle.

With this structure, when the throttle opening detected by the throttle sensor 12 is small in the motor mode switching control, the operational efficiency of the engine 1 is low so that the vehicle is driven exclusively by the motor-generator 5. As a result, it is possible to reduce the fuel consumption rate.

In addition to the aforementioned structure, there is also provided the battery temperature sensor 18 for detecting the temperature of the battery 7. When it is determined on the basis of the output signal from the battery temperature sensor 18 that the battery temperature is not within an ordinary controlled range, the mode switching means switches the mode to the parallel hybrid mode.

With this structure, when the temperature of the battery 7, provided by the battery temperature sensor 18, is low and the battery temperature is outside the ordinary controlled range, the battery 7 cannot be fully charged, if intended so, as it will be damaged. As a result, the mode can be changed to the parallel hybrid mode to prevent the deterioration of the battery.

In addition to the aforementioned structure, there are provided the engine RPM sensor 11 for detecting the RPM of the engine 1 and the motor-generator RPM sensor 15 for detecting the RPM of the motor-generator 5. When it is determined, in the power split mode, based upon the output signals of the engine RPM sensor 11 and the motor-generator RPM sensor 15 that the difference between the RPM of the engine 1 and the RPM of the motor-generator 5 is below a predetermined value, e.g., approximately 50 RPM, the clutch Cd of the apply means is turned ON to rotate the first and second rotary elements 21, 22 together so that the mode is switched to either the parallel hybrid mode or the engine mode in which the engine 1 drives the vehicle.

With this structure, when the power split mode in which the battery 7 has an ordinary state of charge SOC, that is the battery charge is in an acceptable range, such as 60–85% of capacity, is switched to the parallel hybrid mode or the engine mode, the apply means is turned ON to rotate the first and second rotary elements 21, 22 together. The application shock is suppressed to a low level because the application of the apply means occurs when the difference between the RPMs of the engine 1 and the motor-generator 5 is below or substantially equal to the predetermined value.

In addition to the aforementioned structure, when it is determined, in the power split mode, based upon the output signal from the battery residue detecting means 17, indicating the battery is in the low charge state, and by the output signal from the motor-generator RPM sensor 15 that the RPM of the motor-generator 5 is substantially zero, the clutch Cd of the apply means is turned ON to rotate the first and second rotary elements 21, 22 together so that the mode is switched to the parallel hybrid mode or the engine mode in which the engine 1 drives the vehicle.

With this structure, if the residue of the battery 7 is low in the power split mode, that is, a SOC below the acceptable range, the mode is switched to the engine mode in which the drive is provided solely by the engine 1, and the operation of the motor-generator 5 is switched to the generating state from the drive state or when the RPM of the motor-generator 5 is substantially zero to change from negative (generating state) to positive (drive state) values. As a result, it is possible to prevent unnecessary power consumption from the battery and improve the power storage level.

In addition to the aforementioned structure, there is provided the motor-generator RPM sensor 15 for detecting the RPM of the motor-generator 5. If it is determined, in the motor mode, on the basis of the output signal from the motor-generator RPM sensor 15 that the RPM of the motor-generator 5 is over a predetermined value that is close to the maximum RPM of the motor-generator 5, the apply means connects the output shaft 3 of the engine 1 and the first rotary element 21, by turning ON clutch Ci, to switch the mode to the parallel hybrid mode or the engine mode in which the engine 1 drives the vehicle.

With this structure, in the motor mode, the RPM of the motor increases with an increase in the vehicle speed. By switching the mode to one of drive solely by the engine 1 if the motor-generator RPM exceeds a predetermined value, the motor-generator 5 is prevented from over-revolution or excessive RPM.

Figure 4:
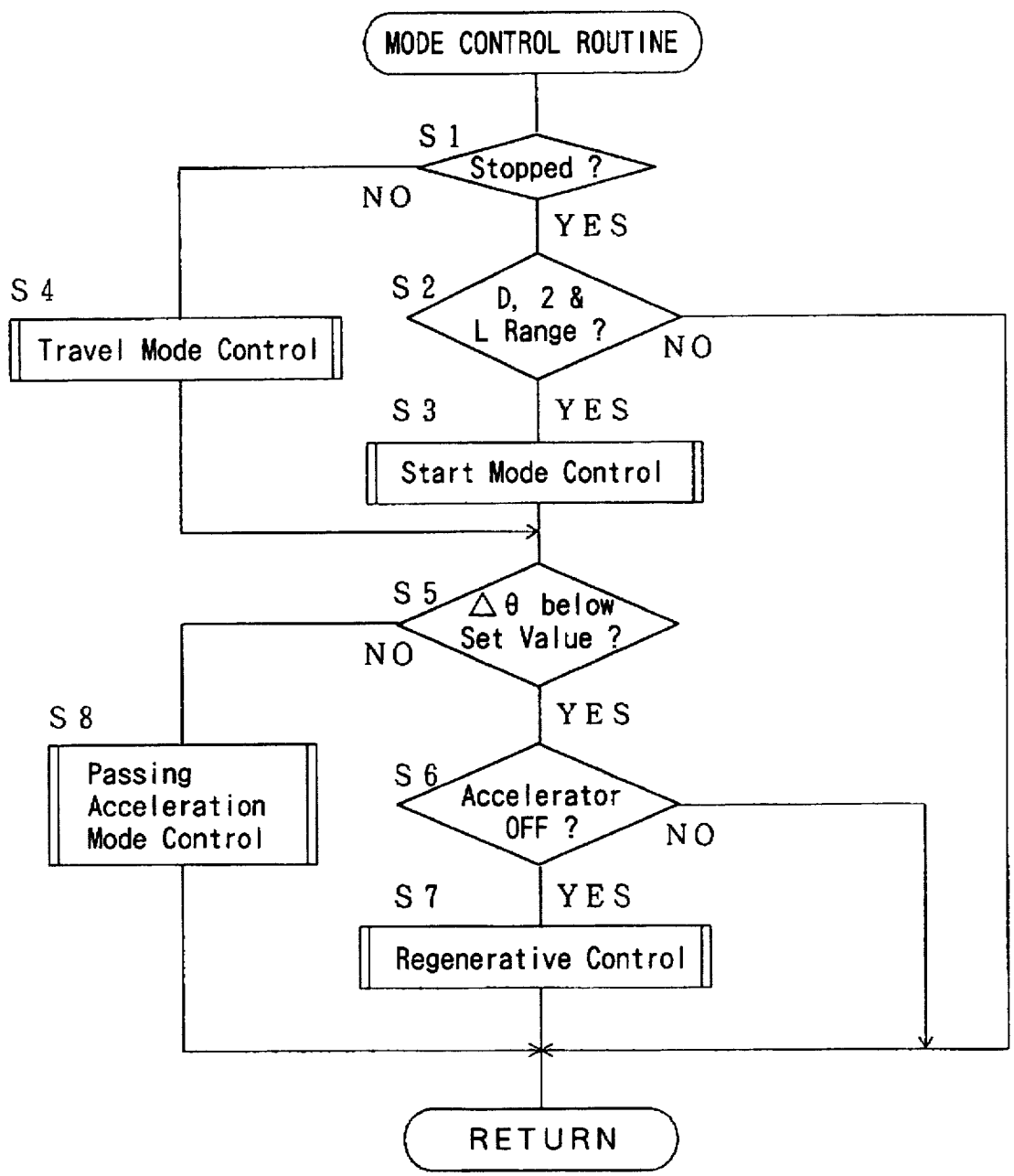
FIG. 4 is a mode control flow chart according to the embodiment of the invention.

Control of the vehicular drive unit will now be described with reference to the flow charts of FIGS. 4–13. FIG. 4 is a mode control flow chart according to the embodiment of the invention.

In the mode control, it is first checked, at Step S1, whether the vehicle is stopped. If the answer of Step S1 is YES, the preparation for starting-up is checked at Step S2, that is, it is checked whether the shift range identified by the shift position sensor 16 is in the forward range, that is, D, 2 or L range. If the answer of Step S2 is YES, the start mode control, to be described below, is executed at Step S3.

If the answer at Step S1 is NO, the travel mode control, to be described below, is executed at Step S4.

Next, a decision concerning acceleration is made, i.e., a determination is made whether a value $\Delta\theta$ is below a set value, e.g., equal to 50% of throttle opening, at Step S5.

If the answer of Step S5 is YES, it is checked, at Step S6, by means of the throttle sensor 12, whether the accelerator pedal is operated, that is, whether the accelerator is OFF. If the answer of Step S6 is YES, the regenerative control, to be described below, is executed at Step S7.

However, if the answer of Step S5 is NO, the passing-acceleration mode control, to be described below, is executed. In other words, if the vehicle requires acceleration, the passing-acceleration mode is entered, at Step S8, so as to assist the torque.

Figure 5:
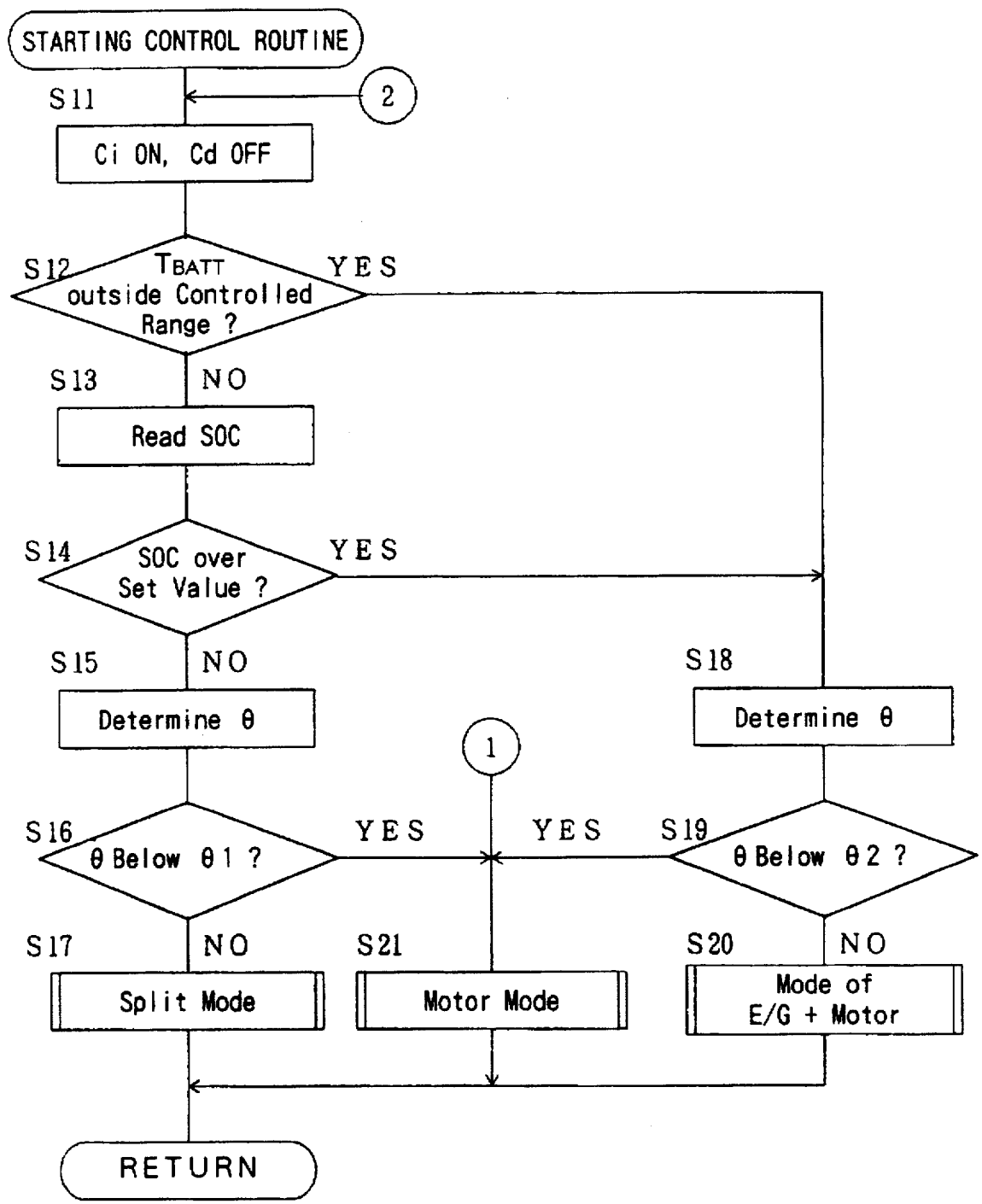
FIG. 5 is a starting control flow chart according to the embodiment of the invention.

FIG. 5 is a starting control flow chart according to the embodiment of the invention. In starting control, the input clutch Ci 24 is turned ON, and the direct-coupled clutch Cd 25 is turned OFF at Step S11. It is then checked, at Step S12, whether the battery charging/discharging characteristics are excellent, that is, whether a battery temperature $T_{BATT}$ is outside a controlled range e.g., 0 to 60° C.

If the answer of Step S12 is NO, the SOC, i.e., state of charge, which is the battery /residue or percentage of capacity, from the battery residue detecting means 17 is read at Step S13.

Next, it is checked, at Step S14, whether the energy at the power split start is received by the battery 7, that is, whether the SOC is over the set value of 60%.

If the answer at Step S14 is NO, the throttle opening $\theta$ is determined at Step S15. Next, it is checked at Step S16 whether the throttle opening $\theta$ is below a set value $\theta 1$, e.g., 20%.

If it is decided at Step S16 that the throttle opening $\theta$ is over the set value $\theta 1$, the mode is set, at Step S17, to the power split mode to be discussed. If the opening is less than or equal to the set value, that is, it is a small opening, the mode is set, at Step S21, to the motor mode.

If the battery temperature $T_{BATT}$ is outside the controlled range at Step S12 or if the SOC is over the set value at Step S14, the throttle opening $\theta$ is determined at Step S18. Next, it is checked at Step S19 whether the throttle opening $\theta$ is over a second set value $\theta 2$, e.g., 30%, If the answer of Step S19 is NO, the mode is set at Step S20 to the parallel hybrid, i.e., PH: engine+motor generator, mode. If the answer of Step S19 is YES, the mode is set, at Step S21, to the motor mode (drive by the motor-generator 5 only) so as to raise the efficiency of the power system.

Figure 6:
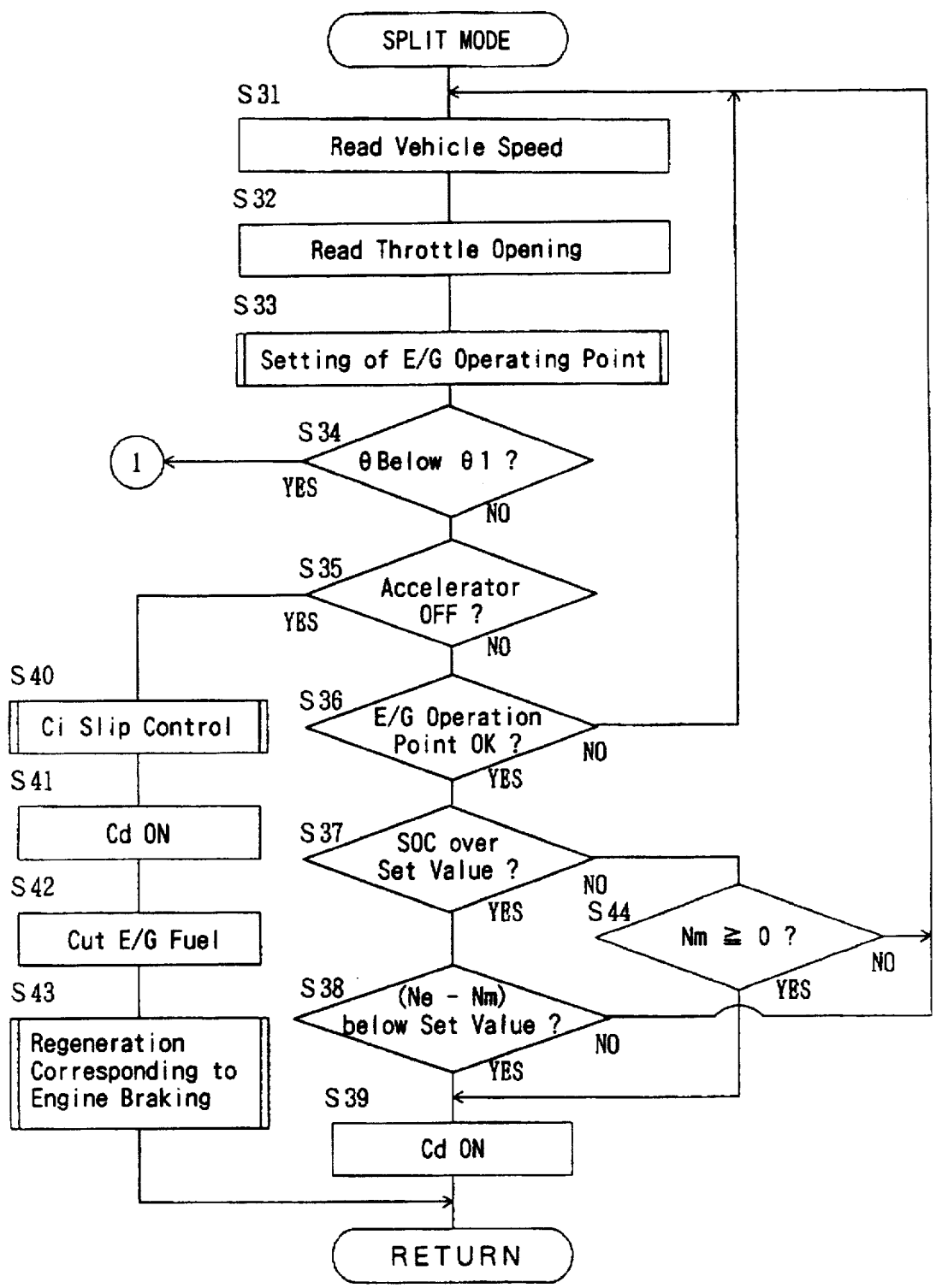
FIG. 6 is a flow chart of a power split mode according to the embodiment of the invention.

FIG. 6 is a flow chart of the power split mode according to the embodiment of the invention. The vehicle speed from the vehicle speed sensor 14 is read at Step S31 and the throttle opening $\theta$ from the throttle sensor 12 is read at Step S32.

Then, with the power split mode, the engine operating point, that is, RPM and torque, is set, at Step S33, based upon the vehicle speed obtained from the vehicle speed sensor 14 and from the throttle opening obtained from the throttle sensor 12.

In Step S34, it is checked whether the throttle opening $\theta$ is below $\theta 1$ or an extremely small value. If this extremely small opening is identified in the power split mode, the mode is reset to the motor mode for the higher vehicle efficiency. If the answer at Step S34 is NO, it is checked, at Step S35, whether the accelerator is OFF.

If the answer of Step S35 is NO, it is checked whether the engine operating point is OK. In other words, the decision for a change in the engine operating point is checked, at Step S36, based upon whether the output is sufficient.

If the answer of Step S36 is YES, it is checked, at Step S37, whether the SOC is over a set value, e.g., SOC>60%. The set value is checked so that if the SOC is low the battery may not be discharged.

If the answer of Step S37 is YES, it is checked at Step S38 whether the difference between the engine RPM Ne, from the engine RPM sensor 11, and the motor-generator RPM Nm, from the motor-generator RPM sensor 15, is over a set value, e.g., 50 RPM.

If the answer of Step S38 is YES, the direct-coupled clutch Cd 25 is turned ON at Step S39 to end the starting control in the power split mode. The application shock is reduced because the direct-coupled clutch Cd 25 is applied after the synchronization.

Meanwhile, if the answer at Step S35 is YES, the routine skips to the regenerative control. First, the input clutch Ci 24 is slip-controlled, that is, the holding force of the input clutch Ci 24 is changed, at Step S40, to hold the engine at the idling RPM. Next, the direct-coupled clutch Cd 25 is turned ON at Step S41 and the engine fuel is cut at Step S42. The regeneration corresponding to the engine braking is executed at Step S43.

If, at Step S37, the answer is NO, that is, the SOC is low, it is checked at Step S44 whether the motor-generator RPM Nm from the motor-generator RPM sensor 15 is 0 or greater. If this answer is YES, the routine goes to Step S39. In short, in order to prevent the battery from being discharged, the direct-coupled clutch Cd 25 is turned ON to end the starting control of the power split mode when the motor-generator RPM is substantially zero.

Further, if the answer at Step S36 is NO, if the answer at Step S44 is NO or if the answer at Step S38 is NO, the routine returns to Step S31.

Incidentally, when the RPM of the motor-generator 5 becomes substantially zero, the automatic transmission 4 may be shifted up. By this shift-up, the input RPM of the automatic transmission 4 drops to lower, in turn, the RPM of the motor-generator 5 again to a negative value. As a result, the motor-generator 5 is maintained in the generating state to charge the battery.

Figure 7:
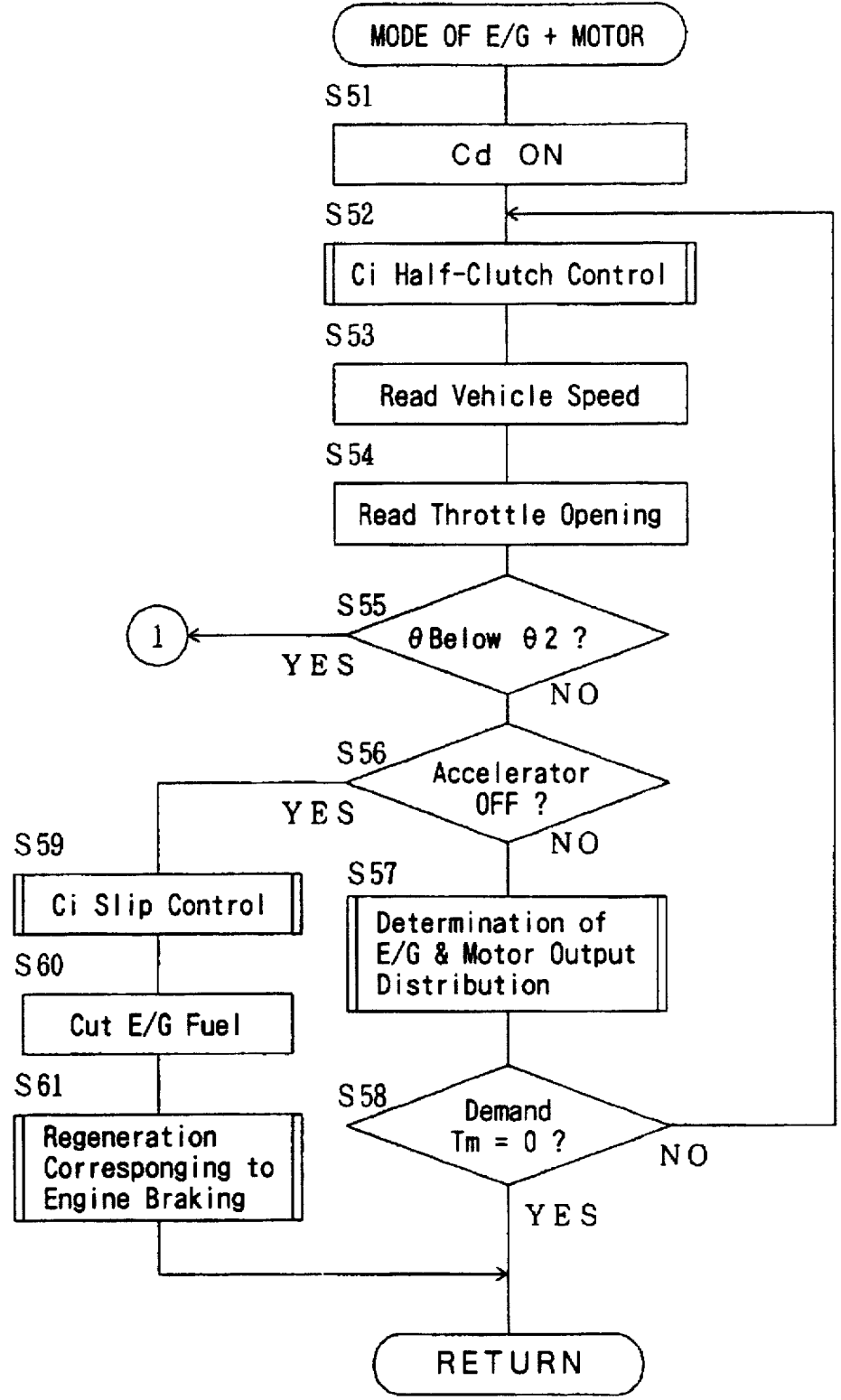
FIG. 7 is a flow chart of a parallel hybrid PH of the starting control according to the embodiment of the invention.

FIG. 7 is a flow chart of the parallel hybrid PH for the starting control according to the embodiment of the invention.

First of all, the direct-coupled clutch Cd 25 is turned ON. Next, the input clutch Ci 24 for the start is subjected to a half-clutch control at Step S52 and the vehicle speed from the vehicle speed sensor 14 is read at Step S53. The throttle opening is then read from the throttle sensor 12 at Step S54. It is then checked at Step S55 whether the throttle opening $\theta$ is below $\theta 2$, the small opening of the throttle. In short, the routine skips to the motor mode when the throttle opening $\theta$ becomes small.

If the throttle opening $\theta$ is not below $\theta 2$, it is checked, at Step S56, whether the accelerator is OFF.

If the answer at Step S56 is NO, the output distribution between the engine 1 and the motor-generator 5 is determined at Step S57. In other words, the output is determined based upon the vehicle speed VS and the throttle opening θ, and any shortage in the engine output is supplemented by the motor-generator 5.

It is then checked, at Step S58, whether the demanded motor-generator torque Tm is 0. For Tm=0, the start control in the parallel hybrid PH mode is ended.

If the answer at Step S56 is YES, the routine skips to the regenerative control and slip control of the input clutch Ci 24 is executed at Step S59 and the engine fuel is cut at Step S60. Then, the regeneration corresponding to the engine braking is executed at Step S61.

Figure 8:
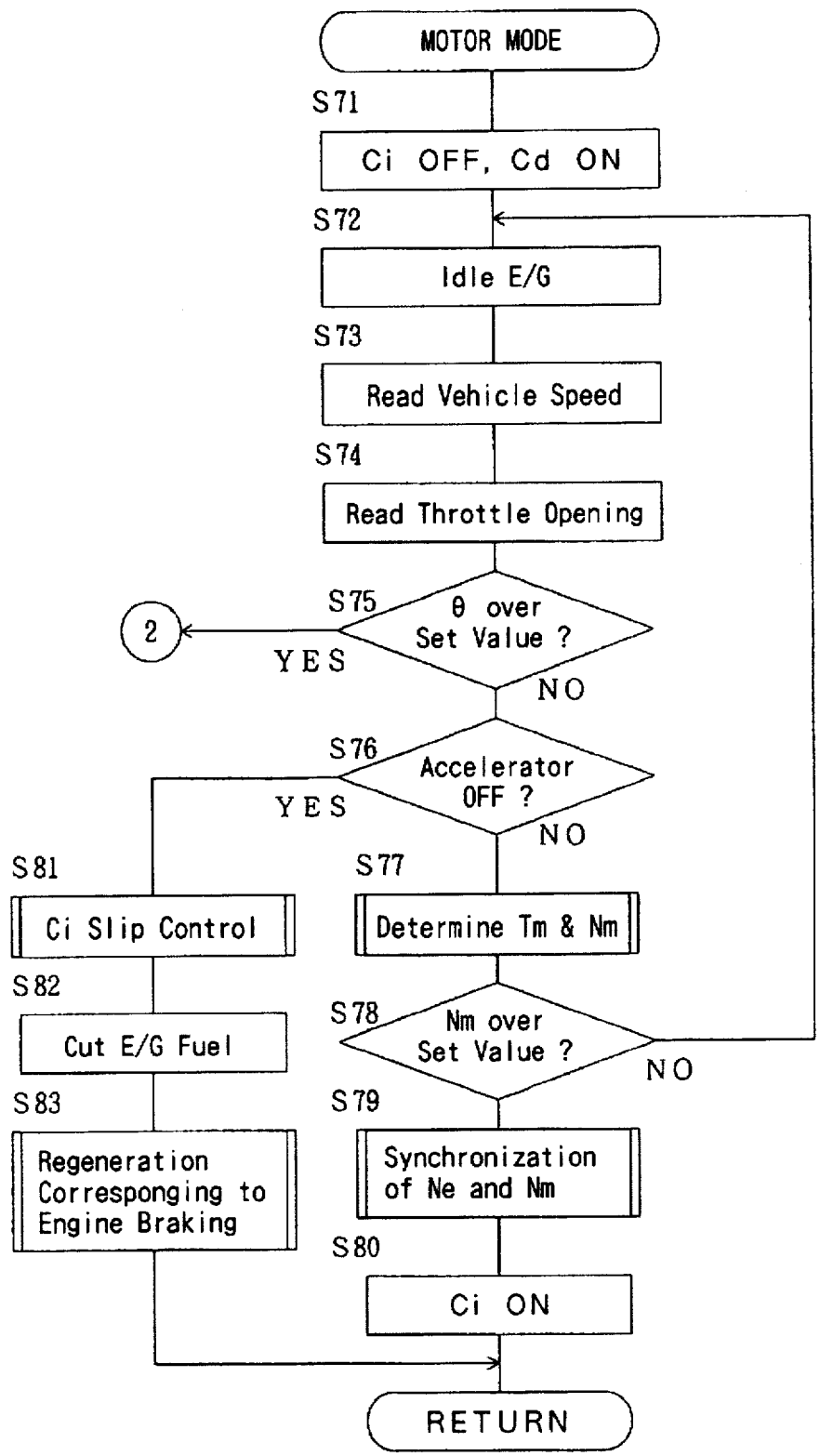
FIG. 8 is a flow chart of a motor mode of the starting control according to the embodiment of the invention.

FIG. 8 is a flow chart of the starting control motor mode according to the embodiment of the invention. First, the input clutch Ci 24 is turned OFF and the direct-coupled clutch Cd 25 is turned ON at Step S71. The engine is then set in the idling state at Step S72. In other words, the engine is held at the idling RPM to maintain the operating state of the accessories.

Next, the vehicle speed, from the vehicle speed sensor 14, is read at Step S73 and the throttle opening, from the throttle sensor 12, is read at Step S74. It is then checked at Step S75 whether the throttle opening θ is over the set value (e.g., throttle opening equals 20%). If the throttle opening θ exceeds the set value, the routine returns to the start of the control routing at Step S11.

If the answer at Step S75 is NO, it is checked at Step S76 whether the accelerator is OFF. If the answer at Step S76 is NO, the motor-generator torque Tm and the motor-generator RPM Nm from the motor-generator RPM sensor 15 are determined at Step S77.

Next, it is checked whether the motor-generator RPM Nm from the motor-generator RPM sensor 15 is over a set value that is, close to the maximum RPM. In short, the motor-generator operating mode is determined at Step S78.

Next, if the motor-generator RPM Nm from the motor-generator RPM sensor 15 is over the set value at Step S78, the engine RPM Ne from the engine RPM sensor 11 is synchronized with the motor-generator RPM Nm at Step S79.

Next, the input clutch Ci 24 is turned ON at Step S80 and the starting control of the motor mode is ended.

If, at Step S76, the answer is YES, that is, if the accelerator is OFF, the routine skips to the regenerative control and the input clutch Ci 24 is subjected to slip control at Step S81, the engine fuel is cut at Step S82, and the regeneration corresponding to the engine braking is executed at Step S83.

Figure 9:
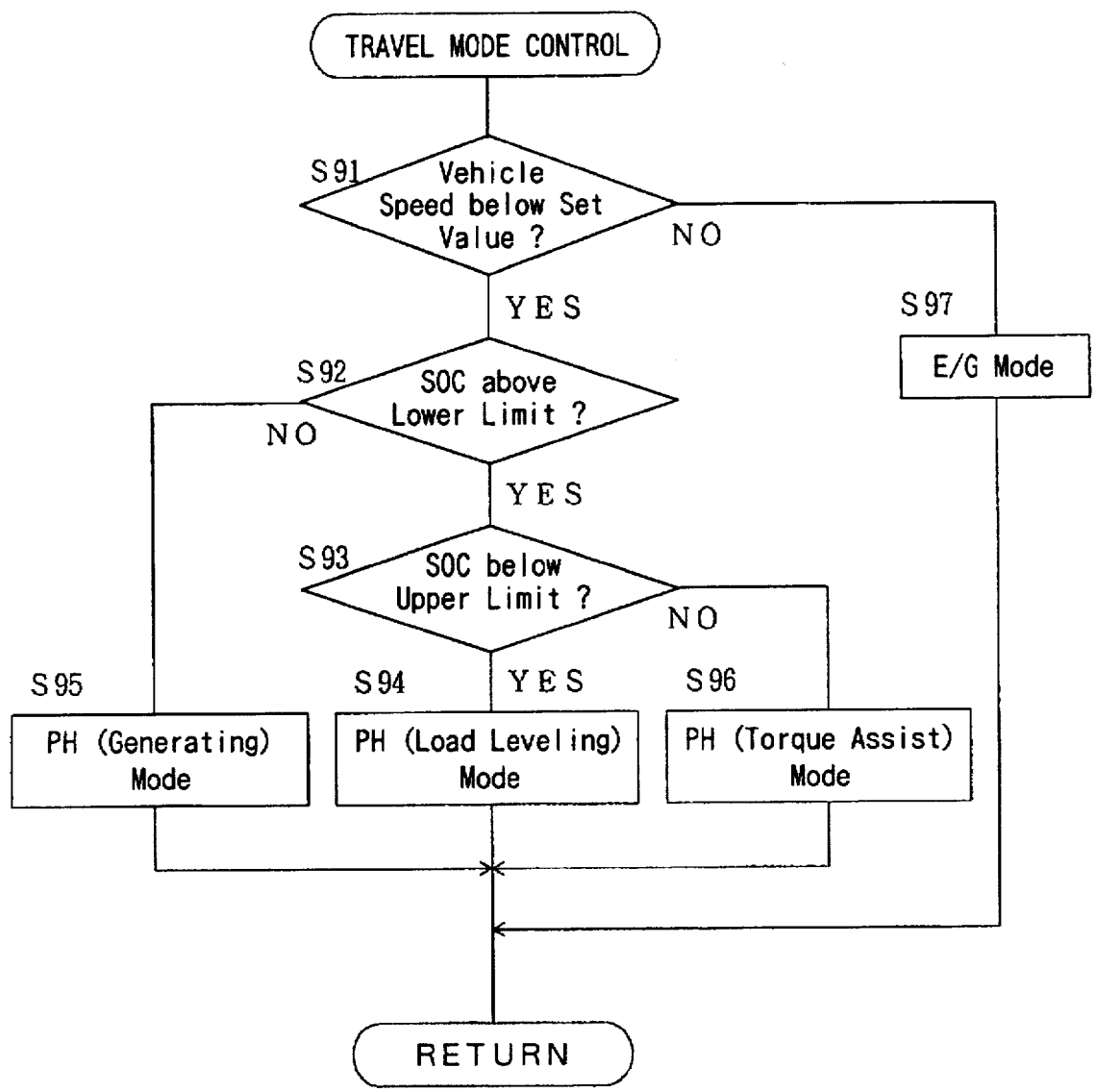
FIG. 9 is a flow chart of a travel mode control according to the embodiment of the invention.

FIG. 9 is a flow chart for the travel mode control, of Step S4 in FIG. 4, according to the embodiment of the invention.

In Step S91, it is checked whether the vehicle speed, as determined from the vehicle speed sensor 14, is below a set value. Here, the set value is set to a very high vehicle speed (e.g., 100 Km/h). If the answer at Step S91 is YES, the routine enters the parallel hybrid mode, in which the generating mode, the load leveling mode and the torque assist mode are selected on the basis of the battery residue SOC. Thus, at Step S92, the battery residue detecting means 17 identifies whether the SOC is over a lower limit, e.g., SOC≧60%.

If yes, it is checked at Step S93 whether the SOC is below an upper limit, e.g., SOC≦85%.

If the answer of Step S93 is YES, that is, if the battery is in the ordinary state, the mode is set at Step S94 to the load leveling mode, in which the torque from the motor-generator 5 is added to or subtracted from the output of the engine 1 by placing the motor-generator 5 in the generating of the electric power state or in the discharge state operating as a motor, so as to maintain the engine 1 in a steady state.

If the answer at Step S92 is NO, that is, if the battery is in the low charge state, the mode is set at Step S95 to the generating mode, in which the vehicle is driven by the engine 1 while the motor-generator 5 generates electric power using the output of the engine 1, so as to restore the electrical power of the battery.

Further, if the answer at Step S93 is NO, that is, if the battery is in the high charge stage, the mode is set at Step S96 to the torque assist mode in which the shortage in the output of the engine 1 is supplemented by the torque of the motor-generator 5.

Lastly, if the answer at Step S91 is NO, that is, if the vehicle speed is high, the mode is set, at Step S97, to the engine mode, in which the vehicle is driven exclusively by the engine 1 because the operating efficiency of the engine 1 is high.

Figure 10:
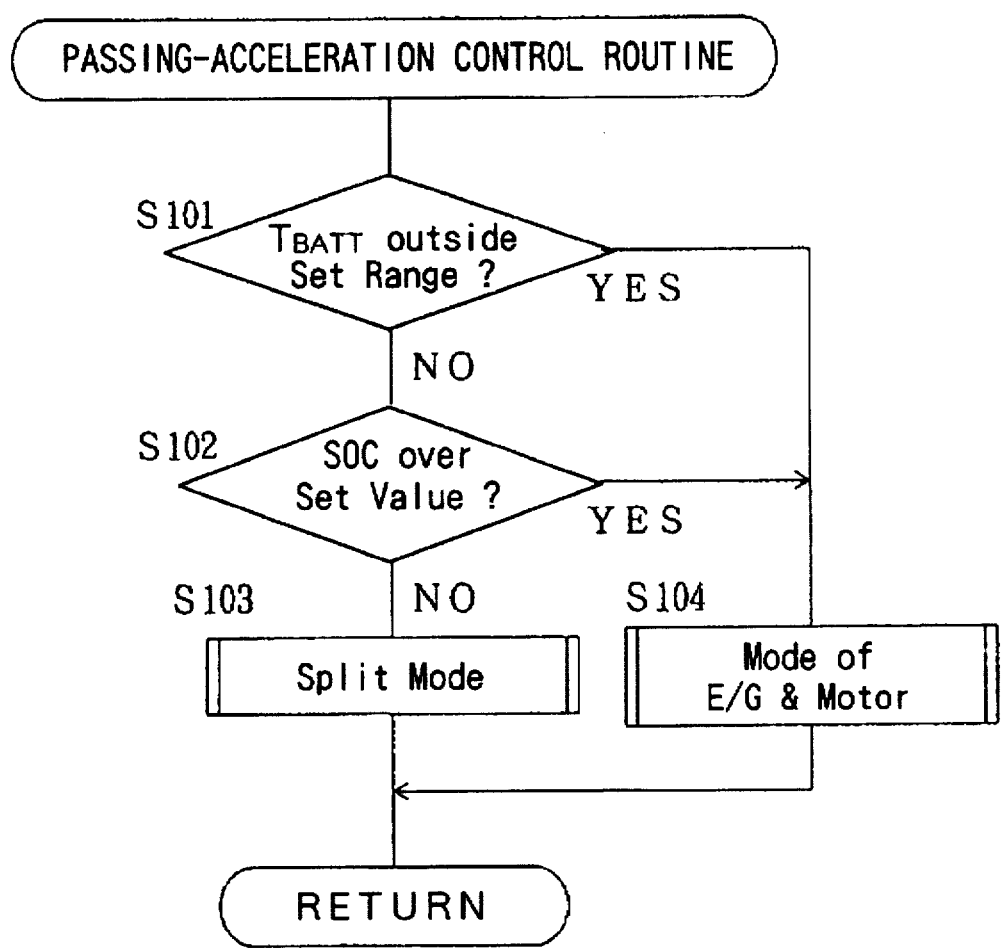
FIG. 10 is a flow chart of a passing-acceleration control according to the embodiment of the invention.

FIG. 10 is a flow chart for the passing-acceleration control, Step S8 of FIG. 4, according to the embodiment of the invention. First, it is checked at Step S101 whether the battery charging/discharging characteristics are good, that is, whether the battery temperature $T_{BATT}$ is outside a set range, e.g., 0° to 60° C.

If the answer at Step S101 is NO, it is checked at Step S102 whether the SOC is over a set value, e.g., SOC>85%. In other words, it is checked whether the energy is to be received, or stored in the battery 7, in the power split mode. If the answer at Step S102 is NO, the routine goes to the power split mode at Step S103 (FIG. 11).

Figure 12:
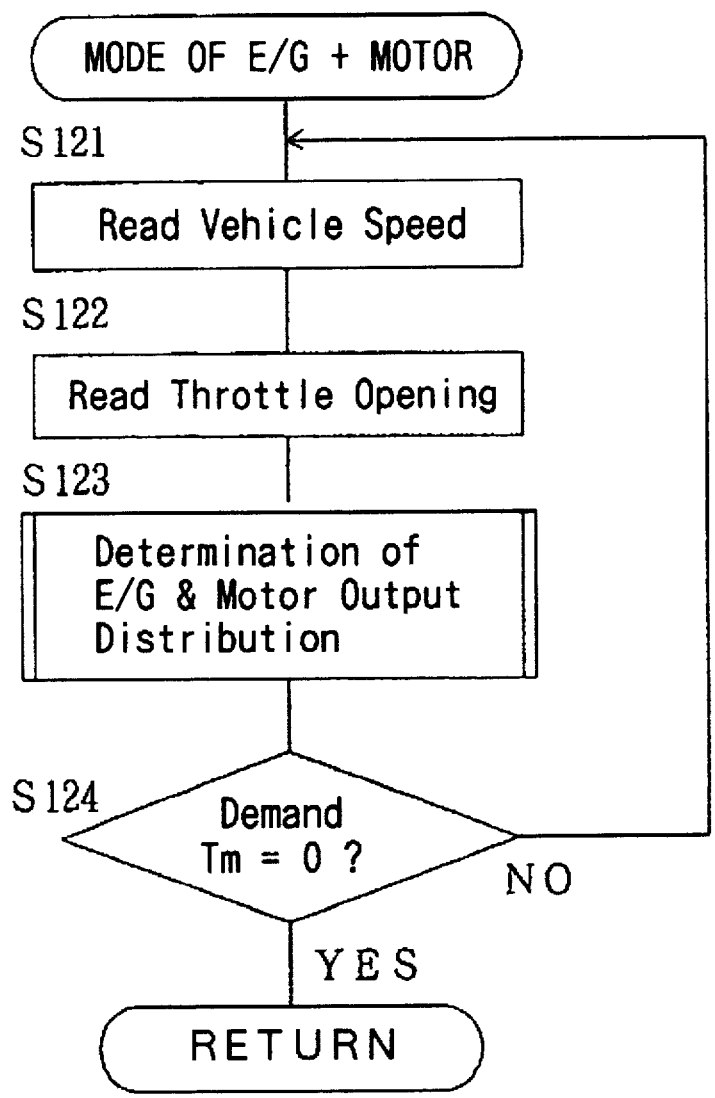
FIG. 12 is a flow chart of a parallel hybrid PH mode of the passing-acceleration control according to the embodiment of the invention.

Whereas, if the answer at Step S101 is YES or if the answer at Step S102 is YES, the routine goes to the parallel hybrid PH mode at Step S104 (FIG. 12).

Figure 11:
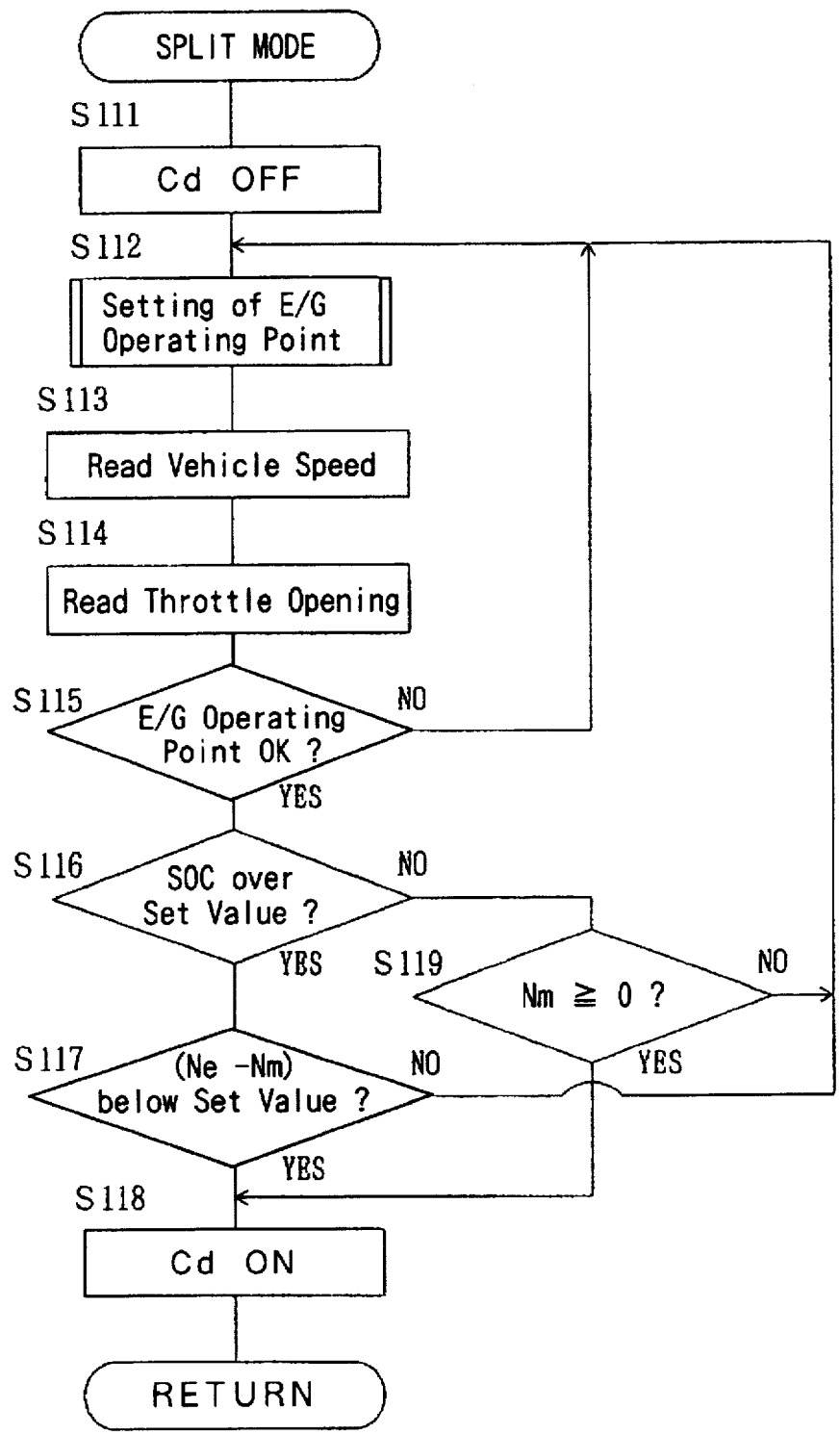
FIG. 11 is a flow chart of a power split mode of the passing-acceleration control according to the embodiment of the invention.

FIG. 11 is a flow chart showing the power split mode, referred to above, for the passing-acceleration control according to the embodiment of the invention. In Step S111, the direct-coupled clutch Cd 25 is turned OFF. The engine operating point is set at Step S112.

The vehicle speed, from the vehicle speed sensor 14, is read at Step S113 and the throttle opening, from the throttle sensor 12, is read at Step S114.

At Step S115, it is checked whether the engine operating point is OK. If the answer at Step S115 is YES, that is, if the engine operating point is OK, it is checked at Step S116 whether the SOC is over a set value, i.e., SOC>85%. If the answer is NO, the routine goes to Step S119.

If the answer at Step S116 is YES, it is checked at Step S117 whether the difference between the engine RPM Ne, from the engine RPM sensor 11, and the motor-generator RPM Nm, from the motor-generator RPM sensor 15, is below a set value, e.g., 50 RPM. If the answer at Step S117 is YES, the direct-coupled clutch Cd 25 is turned ON at Step S118.

Meanwhile, if the answer at Step S116 is NO, it is checked at Step S119 whether the motor-generator RPM Nm of the motor-generator RPM sensor 15 is in the vicinity of 0 by being greater than or equal to 0.

If the answer is NO at Step S115, Step S117 or Step S119, the routine returns to Step S112.

FIG. 12 is a flow chart of the parallel hybrid PH mode, referred to above, for the passing-acceleration control according to the embodiment of the invention. First, the vehicle speed, from the vehicle speed sensor 14, is read at Step S121 and the throttle opening, from the throttle sensor 12, is read at Step S122. Next, the distribution between the engine and the motor is determined at Step S123.

Then, it is checked, at Step S124, whether the demanded total torque Tm is 0 and, if it is, this process terminates. If the demanded total torque Tm is not equal to 0, then the process returns to Step S121.

Figure 13:
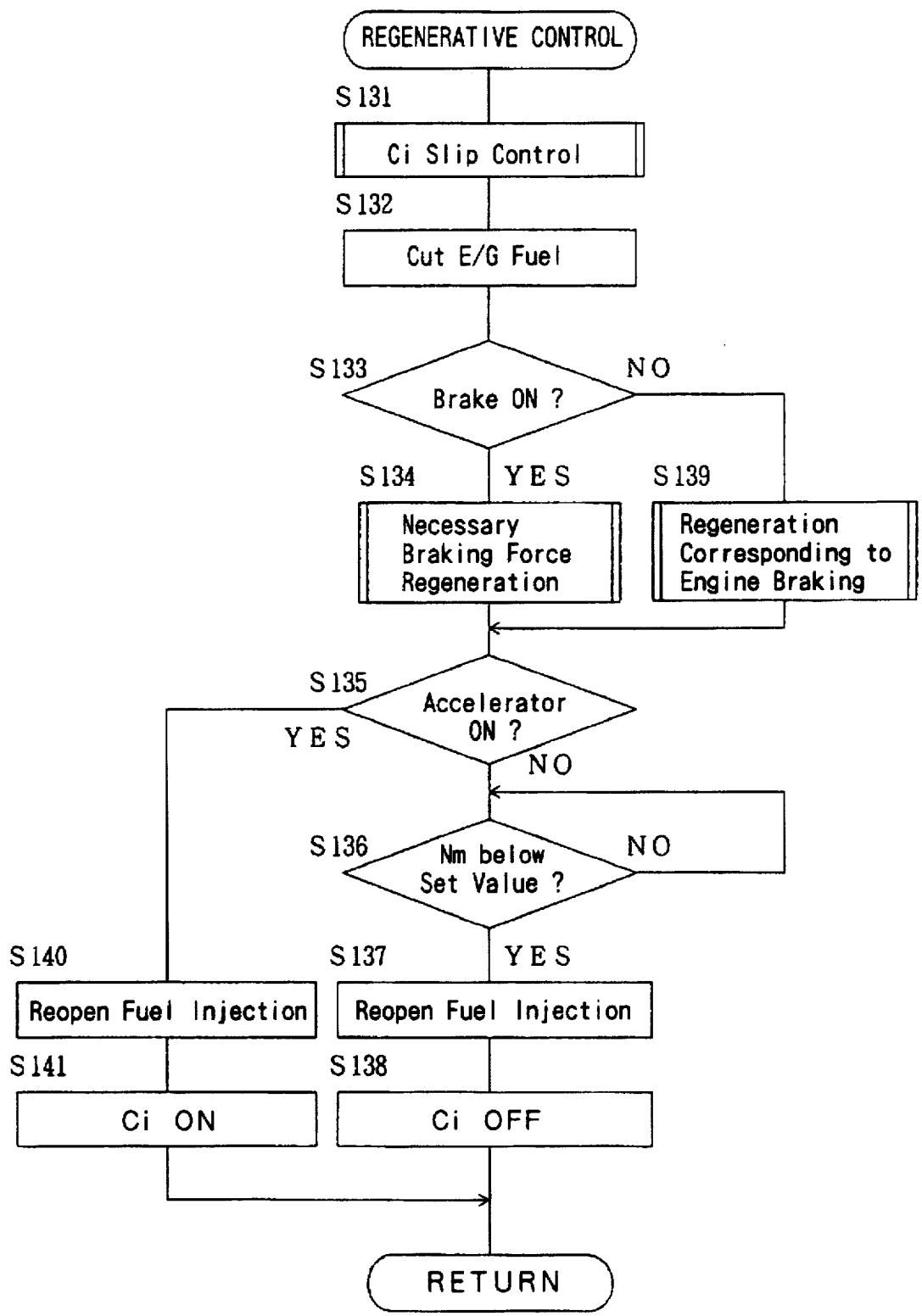
FIG. 13 is a flow chart of a regenerative control according to the embodiment of the invention.

FIG. 13 is a flow chart for the regenerative control, Step S7 of FIG. 4, according to the embodiment of the invention. The input clutch Ci 24 is subjected to the slip control at Step S131. In order that the accessories to be operated may be driven by the engine, the applied force of the input clutch Ci 24 is controlled to control the engine substantially to the idling RPM. At Step S132, the engine fuel is cut.

It is then checked, at Step S133, using the information from the brake depression sensor 13, whether the brake is ON. If the answer at Step S133 is YES, the necessary braking force is regenerated at Step S134. In other words, the regenerative braking force is controlled according to the depression of the brake.

Then, at Step S135, it is checked whether the accelerator is ON. If the answer at Step S135 is NO, it is checked at Step S136 whether the motor-generator RPM Nm, from the motor-generator RPM sensor 15, is below a set value, that is, below a very low RPM just prior to the vehicle stopping. If this answer is NO, the routine returns to Step S136.

However, if the answer of Step S136 is YES, the fuel injection to the engine is reopened at Step S137. In other words, fuel is injected to set the engine substantially to the idling RPM because the engine cannot be driven by the braking force. The input clutch Ci 24 is then turned OFF at Step S138.

Meanwhile, if the answer at Step S133 is NO, the regeneration corresponding to the engine braking is executed at Step S139.

Further, if the answer at Step S135 is YES, reacceleration is called for and the fuel injection to the engine is reopened at Step S140. At Step S141, the input clutch Ci 24 is turned ON.

Figure 14:
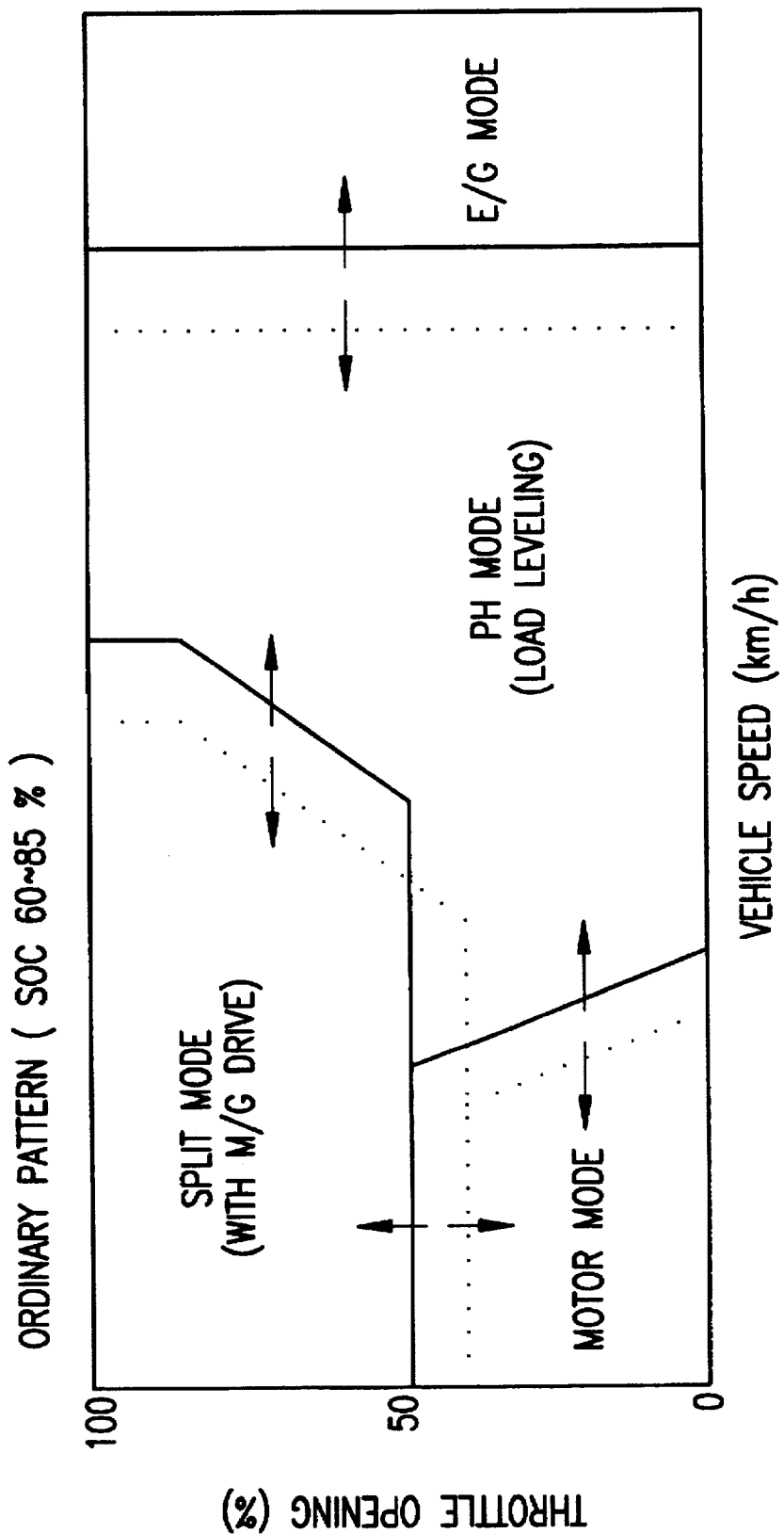
FIG. 14 is a diagram showing a mode map in an ordinary pattern, SOC=60 to 85%, according to the embodiment of the invention.
Figure 15:
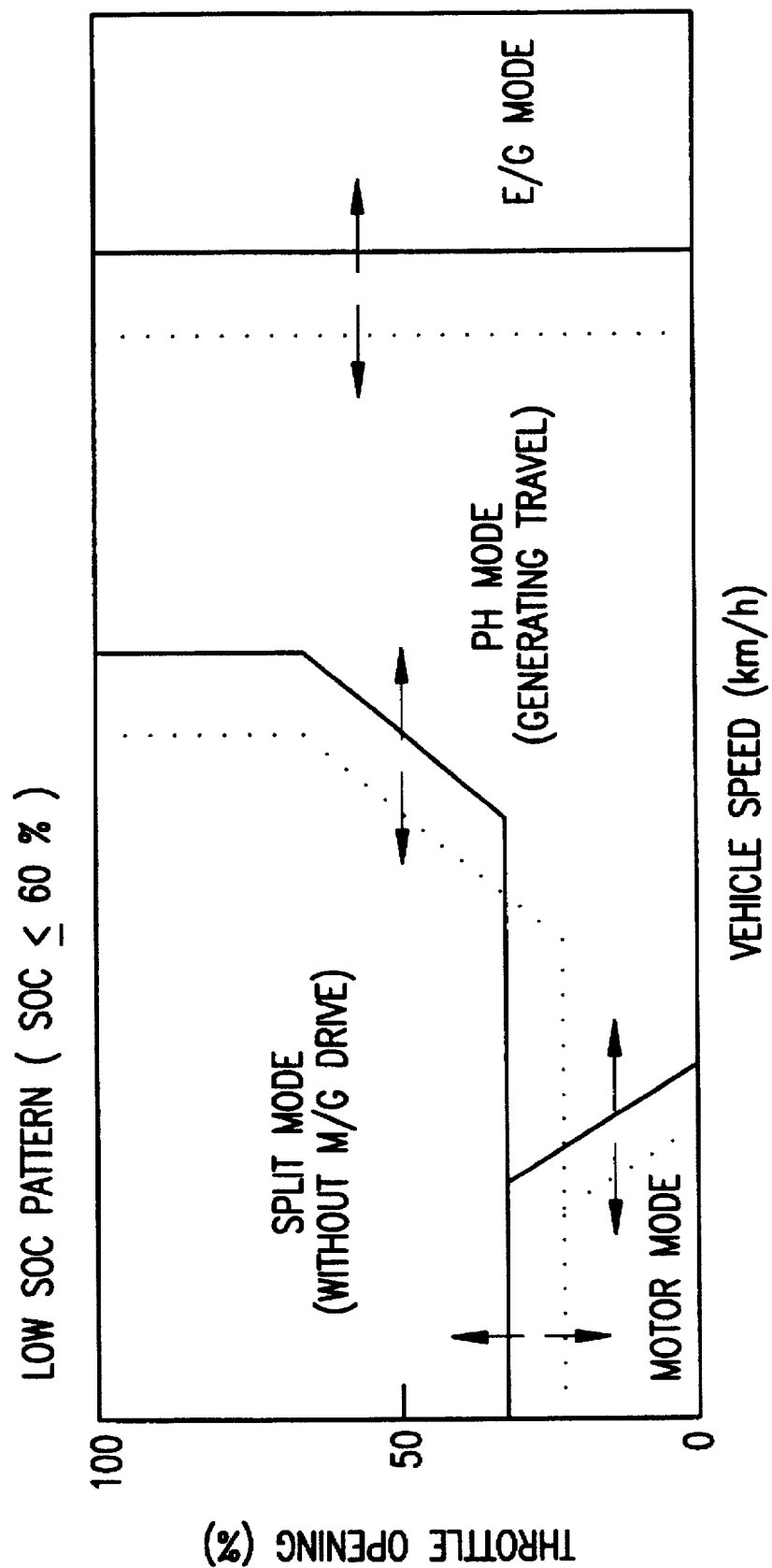
FIG. 15 is a diagram showing a mode map in a low SOC pattern, SOC<60%, according to the embodiment of the invention.
Figure 16:
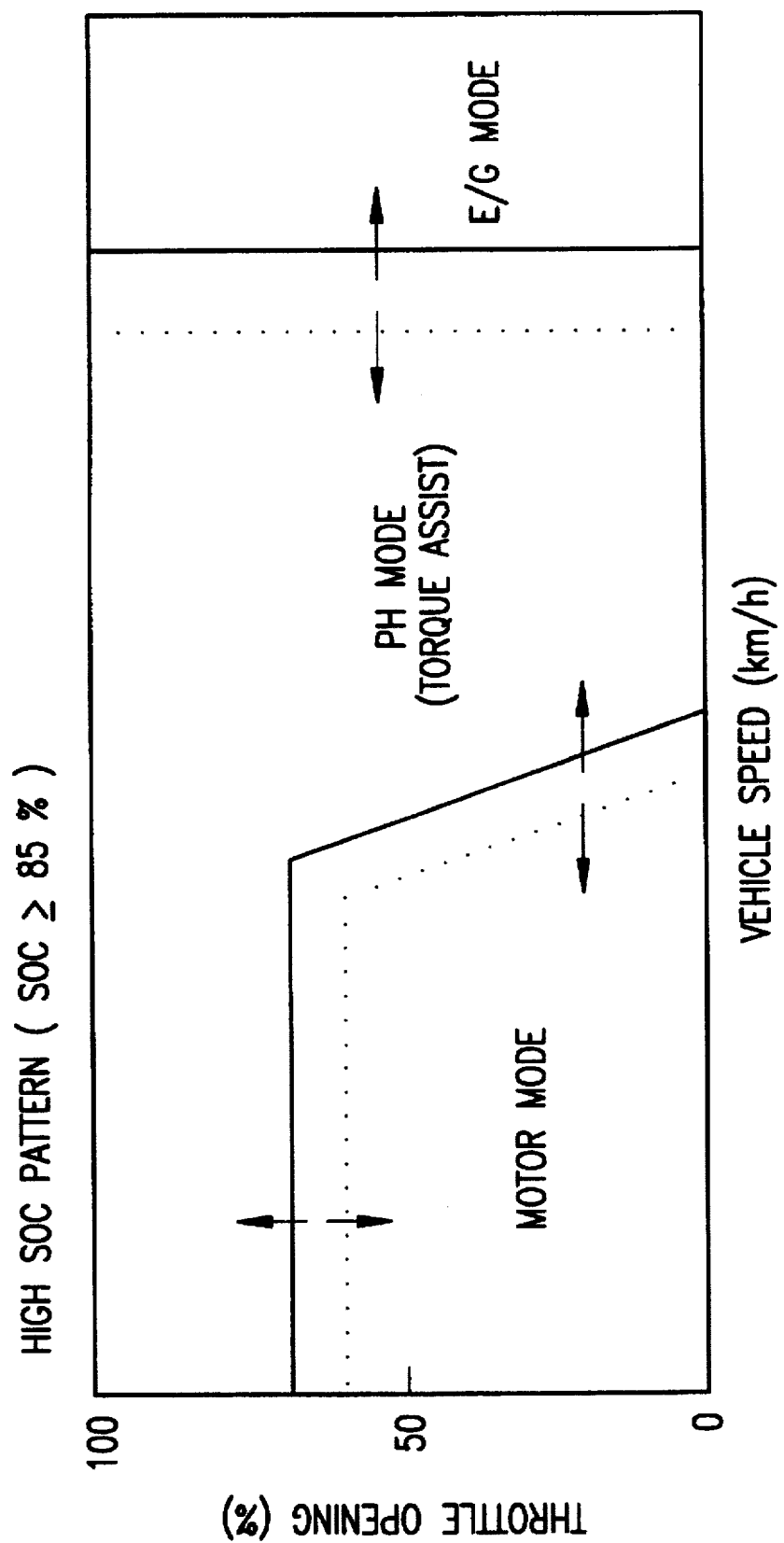
FIG. 16 is a diagram showing a mode map in a high SOC pattern, SOC>85% according to the embodiment of the invention.

Referring to FIGS. 14 to 16, the embodiment of the invention will be described, in which the aforementioned start mode control and travel mode control are executed by the mode switching map using the SOC, the vehicle speed and the throttle opening as parameters.

FIG. 14 is a diagram showing a mode switching map in the ordinary pattern, that is, the battery 7 SOC=60 to 85%; FIG. 15 is a diagram showing a mode switching map in the low SOC pattern, that is SOC<60%; and FIG. 16 is a diagram showing a mode switching map in the high SOC pattern, that is, SOC>85%.

According to the ordinary pattern, shown in FIG. 14, at the starting time, i.e., at the vehicle speed near 0, the mode is switched to the motor mode for a small throttle opening and to the power split mode for a large throttle opening. Moreover, the mode is switched to the parallel hybrid mode as the vehicle speed rises and, thence, to the engine mode for a high vehicle speed range.

According to the low SOC pattern, shown in FIG. 15, at the starting time, the mode is switched, as in the ordinary pattern, to the motor mode and the parallel hybrid mode in accordance with the throttle opening. However, because of the small residue (SOC) of the battery, the motor mode is limited to the region of an extremely small throttle opening and the mode is switched to the parallel hybrid mode as the vehicle speed rises. At a high vehicle speed range the mode is switched again.

According to the high SOC pattern, shown in FIG. 16, at the starting time, the mode is switched to either the parallel hybrid mode or the motor mode, in accordance with the throttle opening, to prevent the battery from being charged in the power split mode. Because the residue (SOC) of the battery is sufficient, moreover, the motor mode is extended to a very large throttle opening range. In the high vehicle speed range, on the other hand, the mode is switched to the engine mode.

Here in the high SOC pattern of FIG. 16, the region of the power split mode is deleted to prevent an overcharge of the battery. In the case of the start in the parallel hybrid mode with a large throttle opening, however, a high precision is required for the half-clutch control of the input clutch Ci 24 at the time of connecting the engine and the motor. For a simple control, therefore, the power split mode may be set in the low vehicle speed range for a large throttle opening. In this case, the region for the power split mode is extremely restricted so that the electric power to be stored in the battery is minimized.

According to the control system for a vehicular drive unit, during travel of the vehicle, the mode is switched to the power split mode and the parallel hybrid mode in accordance with the residue (SOC) of the battery 7. In the ordinary state or the low charge state of the battery 7, more specifically, the mode is set to the power split mode, in which the first, second and third rotary elements 21, 22 and 23 of the planetary gear are individually rotated, and the motor-generator 5 outputs the reaction torque against the output torque of the engine 1 so that the vehicle is started by the composed torque of the engine 1 and the motor-generator 5.

In this case, due to the power generation of the motor-generator 5, the energy of the second rotary element 22 can be stored as electrical power in the battery 7. In the full charge state of the battery 7, on the other hand, the mode is switched to the parallel hybrid mode, in which the apply means (clutches Ci, Cd) connects (clutch Cd: ON) and rotates the first and second rotary elements 21, 22 of the planetary gear, so that the vehicle is driven by the output torque of the engine 1 and the motor-generator 5. In this case, the motor-generator 5 functions as a motor so that the battery 7 is not charged. As a result, the performance of the battery 7 is prevented from being deteriorated by an overcharge.

According to the control system, when the throttle opening, from the throttle sensor 12, is small in the motor mode, the vehicle is driven exclusively by the motor-generator because the operation efficiency of the engine 1 is low. As a result, the fuel consumption rate is reduced.

According to the control system, when the temperature of the battery 7, from the battery temperature sensor 18, is low, the battery 7 cannot be sufficiently charged, and if charged the battery will be damaged. As a result, the deterioration of the performance of the battery is prevented by switching the mode to the parallel hybrid mode to minimize charging.

According to the control system, when the mode is switched from the power split mode (for the ordinary SOC range) to the parallel hybrid mode or the engine mode, the apply means (clutches Ci, Cd) is applied to rotate the first and second rotary elements 21, 22 together. When the difference between the RPMs of the engine 1 and the motor-generator 5 becomes lower than, or substantially equal to, the predetermined value, the apply means (clutches Ci, Cd) are applied so that the application shock is suppressed to a low level.

According to the control system, when the residue of the battery 7 is low in the power split mode for the low SOC, the mode is switched to the parallel hybrid mode or the engine mode at the instant when the operation of the motor-generator 5 is switched from the generating state to the drive state, that is, when the RPM of the motor-generator 5 is substantially zero to change from negative to positive values, so that the consumption of the electric power of the battery 7 is suppressed.

According to the control system, in the motor mode, the RPM of the motor-generator 5 increases with an increase in the vehicle speed. The motor-generator 5 is prevented from any over-revolution by switching the mode to the parallel hybrid mode or the engine mode when the motor-generator RPM exceeds a predetermined value.

According to the control system, the mode switching is executed in accordance with a mode switching map, which is predetermined on the basis of the vehicle speed and the throttle opening, so that the control is simplified. Since, moreover, there are provided a plurality of mode switching maps, for the various battery states, it is possible to prevent any deterioration in the performance of the battery.

The invention should not be limited to the foregoing embodiment but could be modified in various ways on the basis of the description, and any such modifications should not be excluded from the scope of the invention.

What is claimed is:

1. A control system for a vehicular drive unit of a vehicle, comprising:

an engine;

a motor-generator for acting as a motor and a generator;

a power transmission including a planetary gear composed of at least three rotary elements, and apply means for selectively connecting/releasing said rotary elements, the first rotary element of said planetary gear being connected to the output shaft of said engine, the second rotary element, when reacting against said first rotary element, being connected to said motor-generator, and the third rotary element being connected to an output member for transmitting the drive power to wheels of the vehicle;

a battery for storing electric power, as generated by said motor-generator, and for supplying a driving electric power;

residue detecting means for detecting a residue of said battery; and control means for controlling said engine, said motor-generator and said apply means in accordance with an output signal from said residue detecting means, wherein said control means includes mode switching means for switching the mode if it is determined, based upon an output signal of said battery residue detecting means, that said battery is in an ordinary state or in a low charge state, to a power split mode in which said motor-generator outputs a reaction torque against the output torque of said engine so that said apply means may rotate said first, second and third rotary elements individually and, if it is determined, based upon the output signal of said battery residue detecting means, that said battery is in a full charge state, to a parallel hybrid mode in which said motor-generator adds a torque to the output torque of said engine so that said apply means may rotate said first and second rotary elements together.

2. The control system for a vehicular drive unit according to claim 1, further comprising a throttle sensor for detecting a throttle opening, wherein when it is determined, based upon an output signal of said throttle sensor, that the throttle opening is below a predetermined value, said mode switching means switches the mode to a motor mode in which said motor-generator drives the vehicle so that said apply means may disconnect the output shaft of said engine and said first rotary element and may rotate said first and second rotary elements together.

3. The control system for a vehicular drive unit according to claim 1, further comprising a battery temperature sensor for detecting a temperature of said battery, wherein when it is determined based upon an output signal of said battery temperature sensor that the temperature of said battery is not within an ordinarily controlled range, said mode switching means switches the mode to said parallel hybrid mode.

4. The control system for a vehicular drive unit according to claim 1, further comprising:

an engine RPM sensor for detecting a RPM of said engine; and a motor-generator RPM sensor for detecting a RPM of said motor-generator, wherein when it is determined in said power split mode, based upon the output signals from said engine RPM sensor and said motor-generator RPM sensor, that the difference between the RPM of said engine and the RPM of said motor-generator is below a predetermined value, said mode switching means switches the mode to one of said parallel hybrid mode and an engine mode, in which said engine drives the vehicle, so that said apply means may rotate said first and second rotary elements together.

5. The control system for a vehicular drive unit according to claim 4, wherein when it is determined in the power split mode on the basis of the output signal from said battery residue detecting means that said battery is in the low charge state and of the output signal from said motor-generator RPM sensor that the RPM of said motor-generator is substantially zero, said mode switching means switches the mode to one of said parallel hybrid mode or an engine mode, in which said engine drives the vehicle, so that said apply means may rotate said first and second rotary elements together.

6. The control system for a vehicular drive unit according to claim 2, further comprising a motor-generator RPM sensor for detecting a RPM of said motor-generator, wherein when it is determined in the motor mode on the basis of the output signal from said motor-generator RPM sensor that the RPM of said motor-generator is over a predetermined RPM, said mode switching means switches the mode to one of said parallel hybrid mode and an engine mode, in which said engine drives the vehicle, so that said apply means may connect the output shaft of said engine and said first rotary element.

7. A control system for a vehicular drive unit according to claim 2, wherein said mode switching means has a mode switching map for switching between said power split mode, said parallel hybrid mode and said motor mode in accordance with the vehicle speed and the throttle opening, and wherein said mode switching map is a plurality of switching maps, a switching map for each of a plurality of residue ranges for said battery.

* * * * *